Sept. 3, 1963 W. T. SCHOLL, SR 3,102,637
DENTAL BUR BLOCK
Filed June 2, 1960

INVENTOR.
WILLIAM T. SCHOLL, SR.
BY
Attorney

United States Patent Office 3,102,637
Patented Sept. 3, 1963

3,102,637
DENTAL BUR BLOCK
William T. Scholl, Sr., 1300 S. Burkhardt Road,
Evansville, Ind.
Filed June 2, 1960, Ser. No. 33,504
4 Claims. (Cl. 211—69)

The present invention relates to a dental bur block, and more particularly to a new and novel dental bur block which provides for the effective storage of dental burs, as well as for the ready and convenient use thereof.

As is known, dentists continually use burs of different sizes and different functions in the course of their professional activities. The aforesaid dental burs are customarily stored in bur blocks which are placed upon cabinets in the dentist's office or upon a tray adjacent the dental chair. The existing types of bur blocks generally were rectangular in plan view and were limited to receiving only a single size dental bur, mostly a series originating with a given manufacturer.

By virtue of the instant invention, the applicant has provided a new and novel dental bur block which is readily positionable and effectively retained on the pivotal tray forming a part of the dental chair unit, and which includes a series of removable bur-receiving members, each being adapted to receive dental burs of various lengths as well as diameters. Briefly, the applicant's invention comprises a base member adapted to receive bur-receiving members in a step-like relationship thereon, where each of the bur-receiving members are readily removed by means of finger-like arms extending from opposite ends thereof. The instant bur block provides a wide range of adaptability of use for the dentist in that any one or more of the individual dental bur-receiving members may be removed from the base member, if desired, for even greater accessibility to the burs stored thereon.

Accordingly, the principal object of the present invention is to provide a new and novel dental bur block for receiving a large number of different sized dental burs.

A further object of the present invention is to provide a new and novel dental bur block having a series of selectively removable bur-receiving members positioned thereon.

A still further object of the present invention is to provide a new and novel dental bur block which is adapted to be positively retained for convenient and effective use.

A still further and more general object of the present invention is to provide a new and novel dental bur block which is readily manufactured, and which provides a convenience to the user not present in devices in use heretofore.

Other objects and a better understanding of the invention will become more apparent from the following description, taken in conjunction with the accompanying drawing, wherein FIG. 1 is a plan view of a dental bur block made in accordance with the instant invention;

Figure 1:
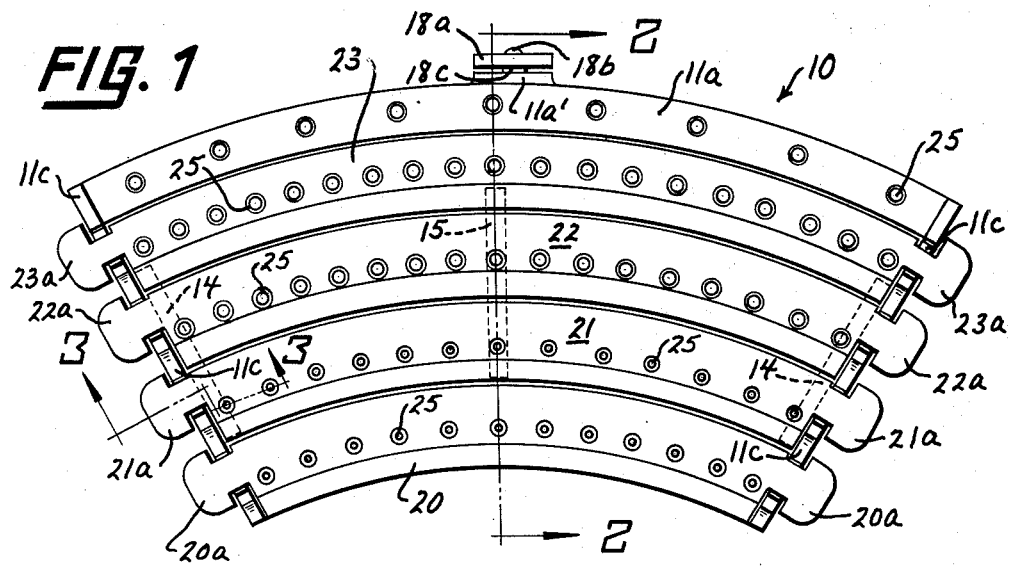

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
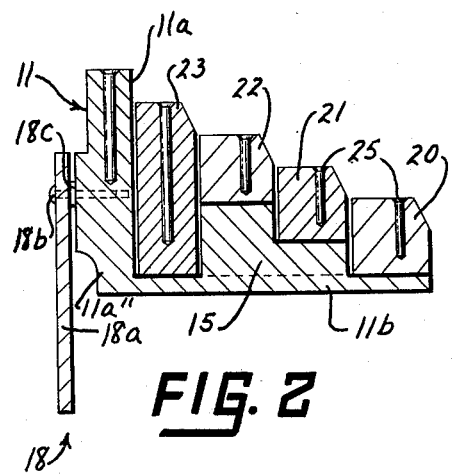
FIG. 2 is a view in vertical section, taken at line 2—2 of FIG. 1 and looking in a direction of the arrows, showing further details of the instant dental bur block.
Figure 4:
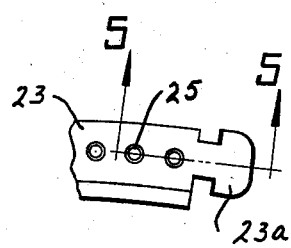
FIG. 4 is a fragmentary plan view of one of the bur-receiving members forming a part of the instant invention; and, FIG. 5 is a view in vertical section of the bur-receiving member of FIG. 4, taken at line 5—5 thereof and looking in the direction of the arrows.
Figure 5:
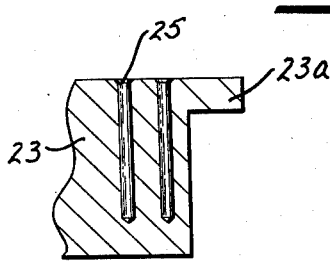
Figure 3:
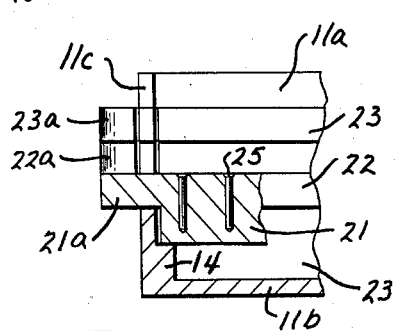
FIG. 3 is another view in vertical section, taken at line 3—3 of FIG. 1 and looking in the direction of the arrows, showing still further details of the applicant's novel dental bur block.

Referring now to the figures, the applicant's novel dental bur block 10 comprises a base member 11 typically made from a plastic or like material. The base member 11 is defined by a rear wall 11a, which also serves as a bur-receiving member, to be discussed herebelow, a bottom wall 11b and side walls 11c. Depending upon the mode of manufacture, the aforementioned components forming the base member 11 may be cast in one piece, or may be made by a combination of separate elements. Extending upwardly from the bottom wall 11b, and typically formed on the side walls 11c, are support members 14, while a support member 15 extends upwardly from the bottom wall 11b at a line approximately midway between the side walls 11c. As should be apparent from FIG. 2, the support members 14 and 15 assume a characteristic step-like appearance in side elevation.

Extending from the front of the dental bur block 10 to the rear wall 11a are a series of bur-receiving members 20, 21, 22 and 23, each of which have openings 25 of various length and diameter defined therein. As should be evident from the drawing, bur-receiving openings 25 are also provided in the rear wall 11a of the base member 11. The bur-receiving members 20, 21, 22 and 23, in combination with the rear wall 11a of the base member 11 form, in side elevation, a step-like relation, with the bur-receiving members 20 and 23 being disposed on the bottom wall 11b of the base section 11, while the bur-receiving members 21 and 22 are supported on the support members 14 and 15. Carrying means in the form of arms 20a, 21a, 22a and 23a, respectively, extend from bur-receiving members 20, 21, 22 and 23, where the aforesaid arms provide ready means for grasping the bur-receiving members in view of their extending away from the plane of the side walls 11c of the base member 11.

A latching means 18 is rotatably secured to a projection 11a' on the rear wall 11a of the base member 11, where such latching means 18 particularly comprises an arm 18a, a screw 18b, and a tension means 18c, the latter typically made from a resilient material, disposed between the arm 18a and the projection 11a' on the rear wall 11a of the base member 11.

In use, the applicant's novel dental bur block 10 is typically placed on the pivotably mounted tray generally forming a part of the dental chair equipment, and is disposed thereon adjacent its rim (not shown) so that an indented portion 11a'' at the lower part of the rear wall 11a extends thereover. The arm 18a forming a part of the fastening means 18 is then positioned behind the upstanding rim so that the latter is secured between the arm 18a and the rear wall 11a, thereby providing effective securing of the dental bur block 10 onto the platform.

The dental bur block is then ready for use by the dentist during his treatment of patients. The dentist may select the desired dental burs from the various rows thereof on the block, or any one, or more, of the dental bur-receiving members 20, 21, 22 and 23 may be selectively removed and placed by the dentist for even more convenient use. Inasmuch as the bur-receiving members 20, 21, 22 and 23 of the dental bur block 10, together with the rear wall 11a thereof, include a variety of different dimensioned openings 25, a large number of dental burs may be effectively stored for ready use.

From the above, it should be apparent that the applicant has provided a new and novel dental bur block which includes a series of removable bur-receiving members arranged so that individual dental burs may be readily removed therefrom as well as replaced for later use. It should be understood, however, that the instant dental bur block is susceptible to changes within the spirit of the invention. For example, and depending upon the ultimate manufacturing process, many of the components may be integrally formed, or even laminated, and, of course, the block may be proportioned and shaped, as desired. Thus, the above description should be considered illustrative and not as limiting the scope of the following claims.

I claim:

1. A dental bur block comprising, in combination, a base section defined by a bottom wall, a rear wall and side walls, at least one support wall extending upwardly from said bottom wall and at an angle to said rear wall, and bur-receiving members freely and individually removably mounted on said at least one support wall and said side walls in stepped relationship upwardly to said rear wall.

2. A dental bur block comprising, in combination, a base section defined by a bottom wall, a rear wall and side walls, and bur-receiving members individually and freely removably mounted on and extending between said side walls.

3. A dental bur block comprising, in combination, a base section defined by a bottom wall, a rear wall and side walls, support walls extending upwardly from said bottom wall and in planes each at an angle to said rear wall, and bur-receiving members individually and freely removably received on said base section in stepped relationship upwardly to said rear wall, certain of said bur-receiving members positioned directly on said bottom wall of said base section and other of said bur-receiving members positioned on said support walls.

4. A dental bur block adapted to be received on a tray having an upturned rim comprising, in combination, a base section defined by a bottom wall, a rear wall and side walls, at least one support member extending upwardly from said bottom wall, bur-receiving members individually and freely removably mounted on said at least one support member and said side walls, said bur-receiving members being disposed in stepped relationship upwardly to said rear wall, and latching means rotatably mounted on said base section adapted to hook over said upturned rim of said tray.

References Cited in the file of this patent

UNITED STATES PATENTS

| | | |
|---|---|---|
| 1,121,934 | Miller | Dec. 22, 1914 |
| 1,135,625 | Savin | Apr. 13, 1915 |
| 1,519,614 | Heck | Dec. 16, 1924 |
| 2,069,528 | Kress | Feb. 2, 1937 |
| 2,344,937 | Brazier | Mar. 21, 1944 |
| 2,427,218 | Liebson | Sept. 9, 1947 |
| 2,496,758 | Tingley | Feb. 7, 1950 |
| 2,904,303 | Gentiline | Sept. 15, 1959 |

FOREIGN PATENTS

| | | |
|---|---|---|
| 5,543 | Great Britain | of 1889 |